US012729304B2

(12) United States Patent
Liu et al.

(10) Patent No.: US 12,729,304 B2
(45) Date of Patent: Sep. 8, 2026

(54) NANOSCALE POLYAMIDE COMPOSITE MATERIAL, AND PREPARATION METHOD THEREFOR AND USE THEREOF

(71) Applicant: SHANGHAI ZHONGLEI NEW MATERIAL SCIENCE CO., LTD., Shanghai (CN)

(72) Inventors: Chunyan Liu, Shanghai (CN); Boen Liu, Shanghai (CN)

(73) Assignee: Shanghai Zhonglei New Material Science Co., Ltd., Shanghai (CN)

( * ) Notice: Subject to any disclaimer, the term of this patent is extended or adjusted under 35 U.S.C. 154(b) by 0 days.

(21) Appl. No.: 19/127,677

(22) PCT Filed: Jun. 30, 2023

(86) PCT No.: PCT/CN2023/105125
§ 371 (c)(1),
(2) Date: May 6, 2025

(87) PCT Pub. No.: WO2024/098812
PCT Pub. Date: May 16, 2024

(65) Prior Publication Data

US 2026/0008339 A1 Jan. 8, 2026

(30) Foreign Application Priority Data

Nov. 7, 2022 (CN) ........................ 202211390769.X

(51) Int. Cl.
*C08L 77/00* (2006.01)
*C08K 3/22* (2006.01)
*B32B 27/34* (2006.01)

(52) U.S. Cl.
CPC ............... *C08L 77/00* (2013.01); *B32B 27/34* (2013.01); *B32B 2307/536* (2013.01); *B32B 2307/746* (2013.01); *B32B 2605/00* (2013.01); *B32B 2605/003* (2013.01); *C08K 2003/2241* (2013.01); *C08K 2201/005* (2013.01); *C08K 2201/011* (2013.01)

(58) Field of Classification Search
CPC ........ B32B 2307/536; B32B 2307/746; B32B 2605/00; B32B 2605/003; B32B 27/34; C08G 75/02; C08G 75/0204; C08G 75/0209; C08G 75/045; C08K 2003/2241; C08K 2201/005; C08K 2201/011; C08L 77/00; C08L 81/02; C09D 181/02; C09J 181/02
See application file for complete search history.

(56) References Cited

U.S. PATENT DOCUMENTS

2008/0206559 A1 8/2008 Li et al.

FOREIGN PATENT DOCUMENTS

| | | | | |
|---|---|---|---|---|
| CN | 101182388 A | | 5/2008 | |
| CN | 101423665 A | | 5/2009 | |
| CN | 104559161 A | | 4/2015 | |
| CN | 105566899 A | | 5/2016 | |
| CN | 107722616 A | | 2/2018 | |
| CN | 109233264 A | | 1/2019 | |
| CN | 111040441 A | | 4/2020 | |
| CN | 114990729 A | | 9/2022 | |
| CN | 115651394 A | | 1/2023 | |
| KR | 20030046754 A | | 6/2003 | |
| KR | 20120069798 A | * | 6/2012 | .............. C08L 77/00 |

OTHER PUBLICATIONS

Machine translation of KR 20030046754. (Year: 2003).*
ISA/CN, "International Search Report for International Application No. PCT/CN2023/105125", Sep. 21, 2023, 5 pages, 2023.
CNIPA, "First Office Action for Application No. 202211390769.X", Jul. 28, 2023, 5 pages, 2023.
CNIPA, "Notification of Grant for Application No. 202211390769.X", Mar. 5, 2024, 1 pages, 2024.
Zou et al., "Manipulating the Phase Morphology in PPS/PA66 Blends Using Clay", Journal of Applied Polymer Science, 2007, vol. 106, No. 4, 2238-2250 [Published online Jul. 25, 2007], 2007.
Zhou et al., "Friction and wear behaviors of polyamide-based composites blended with polyphenylene sulfide", Journal of Thermoplastic Composite Materials, 2014, vol. 27, No. 7, 977-961 [First published online Nov. 5, 2012], 2012.
EPO, "Extended European Search Report for International Application No. PCT/CN2023/105125", Mar. 9, 2026, 6 pages, 2026.

* cited by examiner

*Primary Examiner* — John D Freeman
(74) *Attorney, Agent, or Firm* — Dierker & Kavanaugh, P.C.

(57) ABSTRACT

A nanoscale polyamide composite material, and a preparation method therefor and the use thereof. The nanoscale polyamide composite material comprises 60-95 parts by weight of a polyamide resin, 10-20 parts by weight of polyphenylene sulfide, 2-10 parts by weight of a nanoclay, and 1-2 parts by weight of nano titanium dioxide. The polyphenylene sulfide, the nanoclay and the nano titanium dioxide are matched and then blended with the polyamide resin, which is beneficial for reducing the friction coefficient of the finally obtained nanoscale polyamide resin, enhancing the hardness, self-lubricating properties and friction resistance thereof, and making same meet the use requirements of an automotive instrument panel or an automotive steering wheel.

8 Claims, No Drawings

NANOSCALE POLYAMIDE COMPOSITE MATERIAL, AND PREPARATION METHOD THEREFOR AND USE THEREOF

TECHNICAL FIELD

Embodiments of the present application relate to the technical field of composite materials, such as a nanoscale polyamide composite material, a preparation method therefor and use thereof.

BACKGROUND

Due to the special amide groups contained, the polyamide material has good self-lubrication and friction resistance, which has led to their widespread use in industries such as power tools and consumer appliances. However, with the continuous advancement of technology, various industries have imposed higher requirements on the hardness, wear-resistant, and scratch resistance of polyamide materials.

In order to further improve the wear resistance of polyamide materials, the general solution is to add wear-resistant agents such as molybdenum disulfide, polytetrafluoroethylene or polyethylene with ultra-high molecular weight to the polyamide resin to obtain composite materials with better self-lubrication and friction resistance. CN103897387A discloses a high-strength wear-resistant polyamide composite material, the composite material includes components in parts by weight: 50-55 parts of nylon 66 resin, 15-20 parts of nylon 1010 resin, 0.5-1.2 parts of a coupling agent, 18-20 parts of a flame retardant, 5-10 parts of molybdenum disulfide, 0.3-0.9 parts of an antioxidant, 6-12 parts of polytetrafluoroethylene and 15-20 parts of chopped glass fibers. The disclosed preparation method for the composite material includes: the preparation raw materials are weighed according to parts by weight and put into a high-speed mixer for high-speed mixing to obtain a raw material for granulation; the raw material is put into a twin-screw extruder for melt extrusion with the extrusion temperature from zone one to zone six of the twin-screw extruder controlled, to finally obtain the composite material with good strength, low moisture absorption and low friction coefficient.

CN112358724A discloses a polyamide composition with high wear-resistant and low temperature rise, and a preparation method therefor and use thereof. The polyamide composition includes the following components: polyamide resin, glass fibers, a toughening agent, a first wear-resistant agent, a second wear-resistant agent, a third wear-resistant agent, and an auxiliary agent. The first wear-resistant agent is polyethylene with ultra-high molecular weight, and the average molecular weight of the polyethylene with ultra-high molecular weight is more than or equal to 1.3 million; the second wear-resistant agent is titanium dioxide, and the average particle size of titanium dioxide is 200-300 nm; and the third wear-resistant agent is molybdenum disulfide of lamellar structure. Through the compound of three wear-resistant agents in the application, a polyamide composition with low temperature rise and excellent wear-resistant is prepared. Under test conditions of loading of 30 kg, speed of 30 m/min and sliding distance of 3 km, the polyamide composition has an excellent performance of friction coefficient less than or equal to 0.3 and the maximum heating temperature less than or equal to 227° C.

CN105885399A discloses a high-strength wear-resistant polyamide composite material and a preparation method therefor, the composite material includes components in parts by weight: 30-70 parts of polyamide 66, 3-10 parts of a graft toughening agent, 3-10 parts of a copolymer toughening agent, 10-50 parts of wear-resistant masterbatch, 20-40 parts of a wear-resistant reinforcing filler, 0.1-3 parts of a heat stabilizer, 0.1-3 parts of a nucleating agent, 0.1-3 parts of a lubricant and 0.1-1 part of a silane coupling agent. Firstly, polyamide 66, the graft toughening agent, the copolymer toughening agent, the wear-resistant masterbatch and the wear-resistant reinforcing filler are weighed according to parts by weight and added to a mixer for evenly mixing; then the heat stabilizer, the nucleating agent, the lubricant and the silane coupling agent are weighed according to parts by weight and added into the mixer for evenly mixing together with the aforementioned mixture; and the final uniform mixture is put into a twin-screw extruder for extrusion, followed by injection molded by an injection molding machine to obtain the composite material with the advantages of high rigidity, high toughness, high heat resistance, high wear-resistant and high processing precision.

However, the addition of wear-resistant agents such as molybdenum disulfide, polytetrafluoroethylene, or polyethylene with ultra-high molecular weight may lead to a decrease in the mechanical properties of polyamide resin, especially the hardness of polyamide resin, resulting in that though the wear-resistant of the final obtained polyamide product meets the requirements, the final obtained polyamide product cannot meet the actual demands due to the low hardness.

Therefore, it is an urgent technical problem in the art of developing a nanoscale polyamide composite material with excellent self-lubrication, friction resistance and high hardness is a technical problem that needs to be solved urgently in this field.

SUMMARY

The following is a summary of subject matter that is described in greater detail herein. This summary is not intended to be limiting as to the scope of the claims.

An embodiment of the present application provides a nanoscale polyamide composite material, a preparation method therefor and use thereof. The nanoscale polyamide composite material combines polyphenylene sulfide, nano-clay and nano-titanium dioxide to modify polyamide resin, so as to obtain a nanoscale polyamide composite material having a low friction coefficient and high hardness, while also exhibiting excellent self-lubrication properties and mechanical performance.

In a first aspect, an embodiment of the present application provides a nanoscale polyamide composite material, and the nanoscale polyamide composite material includes the following components in parts by weight:

| Component | Amount |
|---|---|
| polyamide resin | 60-95 parts by weight; |
| polyphenylene sulfide | 10-20 parts by weight; |
| nano-clay | 2-10 parts by weight; and |
| nano-titanium dioxide | 1-2 parts by weight. |

The polyamide resin may be 63 parts by weight, 66 parts by weight, 69 parts by weight, 72 parts by weight, 75 parts by weight, 78 parts by weight, 81 parts by weight, 84 parts by weight, 87 parts by weight, 90 parts by weight, or 93 parts by weight, and specific values between the above values, which are not recited here for brevity.

The polyphenylene sulfide may be 11 parts by weight, 12 parts by weight, 13 parts by weight, 14 parts by weight, 15 parts by weight, 16 parts by weight, 17 parts by weight, 18 parts by weight, or 19 parts by weight, and specific values between the above values, which are not recited here for brevity.

The nano-clay may be 3 parts by weight, 4 parts by weight, 5 parts by weight, 6 parts by weight, 7 parts by weight, 8 parts by weight, or 9 parts by weight, and specific values between the above values, which are not recited here for brevity.

The nano-titanium dioxide may be 1.1 parts by weight, 1.2 parts by weight, 1.3 parts by weight, 1.4 parts by weight, 1.5 parts by weight, 1.6 parts by weight, 1.7 parts by weight, 1.8 parts by weight, or 1.9 parts by weight, and specific values between the above values, which are not recited here for brevity.

The nanoscale polyamide composite material provided in the present application incorporates polyphenylene sulfide (PPS), nano-clay and nano-titanium dioxide into a polyamide resin matrix. After mixing all the components, the polyamide resin forms a band-like, uneven and discontinuous transfer film on the surface of the object, whereas the polyphenylene sulfide lacks the ability to form a transfer film under the same conditions. Consequently, during the friction process of the polyamide-polyphenylene sulfide blend, the presence of the polyamide resin enhances the ability of polyphenylene sulfide to transfer to the opposite object, resulting in a band-like, dense, and discontinuous transfer film in the blended system. According to the principle of "friction heat control", the polyamide resin component in the blend melts due to accumulated frictional heat during sliding, the molten polyamide resin forms a low-shear-strength interfacial layer on the sliding surface, acting as a lubricant to improve the lubrication performance and scratch resistance of the composite material. Simultaneously, the addition of nano-clay and nano-titanium dioxide ensures that the size of these nano-additives is comparable to that of the surrounding polymer chains. This not only increases the hardness of composite but also enhances the binding between the nanoparticles and the polymer matrix. As a result, these nano-additives tend to form a robust transfer layer on the mating surface, preventing direct contact between the surface of the composite material and the mating surface, thereby further reducing the friction and wear of the composite material, and improving the wear-resistant and self-lubricating performance of the composite material.

Preferably, the polyamide resin includes any one or a combination of at least two of polyamide 6, polyamide 66, or polyamide 610.

Preferably, the nano-clay has a particle size of 30-50 nm, for example, 32 nm, 34 nm, 36 nm, 38 nm, 40 nm, 42 nm, 44 nm, 46 nm or 48 nm, and specific values between the above values, which are not recited here for brevity.

Preferably, the nano-titanium dioxide has a particle size of 5-15 nm, for example, 6 nm, 7 nm, 8 nm, 9 nm, 10 nm, 11 nm, 12 nm, 13 nm, or 14 nm, and specific values between the above values, which are not recited here for brevity.

It should be noted that, in the present application, the particle sizes of nano-clay and nano-titanium dioxide both refer to average particle sizes.

As a preferred technical solution of the present application, nano-clay with a particle size of 30-50 nm and nano-titanium dioxide with a particle size of 5-15 nm are selected and matched as nano-additives, which can increase the hardness of the composite material, and further reduce the friction coefficient and increase the scratch resistance and self-lubrication of the final obtained nanoscale polyamide composite material simultaneously.

Preferably, nano-clay and nano-titanium dioxide has a mass ratio of (4-5):1, for example, 4.1:1, 4.2:1, 4.3:1, 4.4:1, 4.5:1, 4.6:1, 4.7:1, 4.8:1, or 4.9:1.

As a preferred technical solution of the present application, nano-clay and nano-titanium dioxide with a mass ratio of (4-5):1 are selected for matching, which can maximize the hardness of the nanoscale polyamide composite material, reduce the friction coefficient and increase the self-lubrication and scratch resistance of the final obtained nanoscale polyamide composite material.

Preferably, the nanoscale polyamide composite material further includes an auxiliary agent.

Preferably, the auxiliary agent in the nanoscale polyamide composite material has a content of 0.5-1.5 parts by weight, for example, 0.6 parts by weight, 0.7 parts by weight, 0.8 parts by weight, 0.9 parts by weight, 1 part by weight, 1.1 parts by weight, 1.2 parts by weight, 1.3 parts by weight, or 1.4 parts by weight, and specific values between the above values, which are not recited here for brevity.

In a second aspect, an embodiment of the present application provides a preparation method for the nanoscale polyamide composite material as described in the first aspect, and the preparation method includes: blending and extruding the polyamide resin, polyphenylene sulfide, nano-clay, nano-titanium dioxide and an optional auxiliary agent, thereby obtaining the nanoscale polyamide composite material.

Preferably, the blending and extruding is performed at a temperature of 250-270° C., for example, 252° C., 254° C., 256° C., 258° C., 260° C., 262° C., 264° C., 266° C. or 268° C., and specific values between the above values, which are not recited here for brevity.

In a third aspect, an embodiment of the present application provides use of the nanoscale polyamide composite material as described in the first aspect in automobiles.

Preferably, the use includes use in an automotive instrument panel or an automotive steering wheel.

Compared with the prior art, embodiments of the present application has the following beneficial effects.

The nanoscale polyamide composite material provided in the embodiment of the present application includes a combination of polyamide resin, polyphenylene sulfide, nano-clay and nano-titanium dioxide, and the polyphenylene sulfide, nano-clay and nano-titanium dioxide are matched and added in the polyamide resin matrix, which can not only increase the hardness of the polyamide composite material, but also effectively reduce the friction coefficient and increase the lubricating performance and scratch resistance of the polyamide composite material. Specifically, the polyamide composite material provided in the present application has a tensile strength of 143-154 MPa, a bending strength of 172-180 MPa, a hardness of 0.3-0.8, and a friction coefficient of A-B, which can meet the use requirements of an automotive instrument panel or an automotive steering wheel.

Other aspects will be appreciated upon reading and understanding the detailed description.

DETAILED DESCRIPTION

The technical solutions of the present application are further described below in terms of specific embodiments. It should be clear to those skilled in the art that the embodiments are merely used for a better understanding of the present application and should not be regarded as a specific limitation to the present application.

Example 1

A nanoscale polyamide composite material, which includes the following components in parts by weight:

| | |
|---|---|
| polyamide resin | 95 parts by weight; |
| polyphenylene sulfide | 10 parts by weight; |
| nano-clay | 2 parts by weight; and |
| nano-titanium dioxide | 1.2 parts by weight. |

The preparation method for the nanoscale polyamide composite material provided in this example includes: polyamide resin (Guangdong Xinhui Meida Co., Ltd., with a melt index of 26 g·10 $min^{-1}$ (235° C., 2.16 kg) and a density of 1.54 g·$cm^{-3}$), polyphenylene sulfide (Ticona, USA, polyphenylene sulfide PPS 6165A6 SD3002), nano-clay (with an average particle size of 40 nm) and nano-titanium dioxide (with an average particle size of 10 nm) were blended and extruded at 260° C. to give the nanoscale polyamide composite material.

Example 2

A nanoscale polyamide composite material, which includes the following components in parts by weight:

| | |
|---|---|
| polyamide resin | 85 parts by weight; |
| polyphenylene sulfide | 12 parts by weight; |
| nano-clay | 4 parts by weight; and |
| nano-titanium dioxide | 1.4 parts by weight. |

The preparation method for the nanoscale polyamide composite material provided in this example includes: polyamide resin (Guangdong Xinhui Meida Co., Ltd., with a melt index of 26 g·10 $min^{-1}$ (235° C., 2.16 kg)), polyphenylene sulfide (Ticona, USA, polyphenylene sulfide PPS 6165A6 SD3002), nano-clay (with an average particle size of 45 nm) and nano-titanium dioxide (with an average particle size of 15 nm) were blended and extruded at 260° C. to give the nanoscale polyamide composite material.

Example 3

A nanoscale polyamide composite material, which includes the following components in parts by weight:

| | |
|---|---|
| polyamide resin | 75 parts by weight; |
| polyphenylene sulfide | 14 parts by weight; |
| nano-clay | 6 parts by weight; and |
| nano-titanium dioxide | 1.5 parts by weight. |

The preparation method for the nanoscale polyamide composite material provided in this example includes: polyamide resin (Guangdong Xinhui Meida Co., Ltd., with a melt index of 26 g·10 $min^{-1}$ (235° C., 2.16 kg)), polyphenylene sulfide (Ticona, USA, polyphenylene sulfide PPS 6165A6 SD3002), nano-clay (with an average particle size of 40 nm) and nano-titanium dioxide (with an average particle size of 10 nm) were blended and extruded at 260° C. to give the nanoscale polyamide composite material.

Example 4

A nanoscale polyamide composite material, which includes the following components in parts by weight:

| | |
|---|---|
| polyamide resin | 65 parts by weight; |
| polyphenylene sulfide | 18 parts by weight; |
| nano-clay | 8 parts by weight; and |
| nano-titanium dioxide | 1.8 parts by weight. |

The preparation method for the nanoscale polyamide composite material provided in this example includes: polyamide resin (Guangdong Xinhui Meida Co., Ltd., with a melt index of 26 g·10 min 1 (235° C., 2.16 kg)), polyphenylene sulfide (Ticona, USA, polyphenylene sulfide PPS 6165A6 SD3002), nano-clay (with an average particle size of 40 nm) and nano-titanium dioxide (with an average particle size of 10 nm) were blended and extruded at 260° C. to give the nanoscale polyamide composite material.

Example 5

A nanoscale polyamide composite material, which includes the following components in parts by weight:

| | |
|---|---|
| polyamide resin | 60 parts by weight; |
| polyphenylene sulfide | 20 parts by weight; |
| nano-clay | 10 parts by weight; and |
| nano-titanium dioxide | 2 parts by weight. |

The preparation method for the nanoscale polyamide composite material provided in this example includes: polyamide resin (Guangdong Xinhui Meida Co., Ltd., with a melt index of 26 g·10 $min^{-1}$ (235° C., 2.16 kg)), polyphenylene sulfide (Ticona, USA, polyphenylene sulfide PPS 6165A6 SD3002), nano-clay (with an average particle size of 40 nm) and nano-titanium dioxide (with an average particle size of 10 nm) were blended and extruded at 260° C. to give the nanoscale polyamide composite material.

Example 6

A nanoscale polyamide composite material, which differs from Example 4 in that nano-clay has an additive amount of 8.8 parts by weight, and nano-titanium dioxide has an additive amount of 1 part by weight. Other components, usage amounts, and preparation method were all the same as those of Example 4.

Example 7

A nanoscale polyamide composite material, which differs from Example 4 in that nano-clay has an additive amount of 7.8 parts by weight, and nano-titanium dioxide has an additive amount of 2 parts by weight. Other components, usage amounts, and preparation method were all the same as those of Example 4.

Example 8

A nanoscale polyamide composite material, which differs from Example 4 in that nano-titanium dioxide has a particle size of 40 nm. Other components, usage amounts, and preparation method were all the same as those of Example 4.

Example 9

A nanoscale polyamide composite material, which differs from Example 4 in that nano-titanium dioxide has a particle size of 100 nm. Other components, usage amounts, and preparation method were all the same as those of Example 4.

Comparative Example 1

A nanoscale polyamide composite material, which differs from Example 4 only in that nano-clay was not added, and nano-titanium dioxide has an additive amount of 9.8 parts by weight. Other components, usage amounts, and preparation method were all the same as those of Example 4.

Comparative Example 2

A nanoscale polyamide composite material, which differs from Example 4 only in that nano-titanium dioxide was not added, and nano-clay has an additive amount of was 9.8 parts by weight. Other components, usage amounts, and preparation method were all the same as those of Example 4.

Comparative Example 3

A nanoscale polyamide composite material, which differs from Example 4 only in that the polyamide resin has an additive amount of 100 parts by weight. Other components, usage amounts, and preparation method were all the same as those of Example 4.

Comparative Example 4

A nanoscale polyamide composite material, which differs from Example 4 only in that the polyamide resin has an additive amount of 50 parts by weight. Other components, usage amounts, and preparation method were all the same as those of Example 4.

Comparative Example 5

A nanoscale polyamide composite material, which differs from Example 4 only in that polyethylene with ultra-molecular weight (Ticona, USA, GUR 4152NH) was used to replace polyphenylene sulfide. Other components, usage amounts, and preparation method were all the same as those of Example 4.

Comparative Example 6

A nanoscale polyamide composite material, which differs from Example 4 only in that polytetrafluoroethylene (Solvay, USA, D2510F) was used to replace nano-titanium dioxide. Other components, usage amounts, and preparation method were all the same as those of Example 1.

Comparative Example 7

A nanoscale polyamide composite material, which differs from Example 4 only in that polytetrafluoroethylene (manufacturer: Solvay, USA, model: D2510F) was used to replace nano-clay. Other components, usage amounts, and preparation method were all the same as those of Example 1.

Comparative Example 8

A nanoscale polyamide composite material, which differs from Example 4 only in that molybdenum disulfide was used to replace nano-clay. Other components, usage amounts, and preparation method were all the same as those of Example 4.

Comparative Example 9

A nanoscale polyamide composite material, which differs from Example 4 only in that molybdenum disulfide was used to replace nano-titanium dioxide. Other components, usage amounts, and preparation method were all the same as those of Example 4.

Performance tests:

(1) Tensile strength: tested in accordance with the test method provided by ISO527;

(2) Bending strength: tested in accordance with the test method provided by ISO293;

(3) Hardness: tested in accordance with the test method provided by ISO2039; and (4) Friction coefficient: tested in accordance with the test method provided by GB3906.

The nanoscale polyamide composite materials provided in Example 1-9 and Comparative Example 1-9 were subjected to tests according to the above test methods, and the test results are shown in Table 1.

TABLE 1

| | Tensile strength/MPa | Bending strength/MPa | Hardness | Friction coefficient |
|---|---|---|---|---|
| Example 1 | 143 | 176 | 0.6 | A |
| Example 2 | 146 | 172 | 0.8 | A |
| Example 3 | 148 | 177 | 0.7 | B |
| Example 4 | 151 | 179 | 0.5 | A |
| Example 5 | 154 | 180 | 0.4 | A |
| Example 6 | 150 | 174 | 0.4 | A |
| Example 7 | 149 | 173 | 0.3 | A |
| Example 8 | 145 | 175 | 0.3 | A |
| Example 9 | 146 | 174 | 0.3 | A |
| Comparative Example 1 | 145 | 173 | 0.3 | B |
| Comparative Example 2 | 144 | 172 | 0.2 | B |
| Comparative Example 3 | 142 | 172 | 0.2 | B |
| Comparative Example 4 | 143 | 171 | 0.3 | B |
| Comparative Example 5 | 142 | 172 | 0.3 | B |
| Comparative Example 6 | 144 | 174 | 0.2 | B |
| Comparative Example 7 | 143 | 171 | 0.1 | B |
| Comparative Example 8 | 144 | 173 | 0.3 | B |
| Comparative Example 9 | 145 | 174 | 0.3 | B |

According to the data in Table 1, it can be seen that the nanoscale polyamide composite material provided in the present application has high tensile strength, bending strength and hardness, and also has excellent friction properties.

Specifically, the polyamide composite materials prepared in Examples 1-9 have tensile strength of 143-154 MPa, bending strength of 172-180 MPa, hardness of 0.3-0.8, and friction coefficient of A-B.

Comparing the data of Example 4 and Comparative Examples 1-2, it can be seen without adding nano-clay (Comparative Example 1) or nano-titanium dioxide (Comparative Example 2), the tensile strength, bending strength and hardness of the obtained polyamide composite material to decrease, and the friction properties also have decreased simultaneously.

Then comparing the data of Example 4 and Comparative Examples 3-4, it can be found that the additive amount of polyamide resin is too high (Comparative Example 3) or too low (Comparative Example 4) will also lead to the tensile strength, bending strength and hardness of the obtained polyamide composite material to decrease, and the friction properties also have decreased simultaneously.

Further comparing the data of Example 4 and Comparative Examples 5-7, it can also be found that the use of polyethylene with ultra-molecular weight instead of polyphenylene sulfide (Comparative Example 5), use of polytetrafluoroethylene instead of nano-titanium dioxide (Comparative Example 6) or use of polytetrafluoroethylene instead of nano-clay (Comparative Example 7) will all lead to the decrease of tensile strength, flexural strength and hardness of the obtained polyamide composite material, as well the deterioration of friction properties.

Even further comparing the data of Example 4 and Comparative Examples 8-9, it can be found that the use of molybdenum disulfide instead of nano-clay (Comparative Example 8) or use of molybdenum disulfide instead of nano-titanium dioxide (Comparative Example 9) will also affect the tensile strength, flexural strength, hardness and friction properties of the final obtained polyamide composite material.

Finally, comparing the data of Example 4 and Examples 6-10, it can also be found that the ratio of usage amount of nano-clay and nano-silicon dioxide is not in the preferred range limited in the present application (Examples 6 and 7) or the particle size of silicon dioxide is not in the preferred range limited in the present application (Comparative Examples 8-10) will also affect the tensile strength, flexural strength, hardness and friction properties of the final obtained polyamide composite material.

The applicant declares that the present application illustrates a nanoscale polyamide composite material, a preparation method therefor and use thereof by the above examples, but the present application is not limited to the above examples, that is, the present application does not necessarily rely on the above examples to be implemented. Those skilled in the art should understand that any improvements of the present application, the equivalent substitution of each raw material, the addition of auxiliary ingredients, and the selection of specific methods shall fall within the protection scope and disclosure scope of the present application.

What is claimed is:

1. A nanoscale polyamide composite material, comprising the following components in parts by weight:

| | |
|---|---|
| polyamide resin | 60-95 parts by weight; |
| polyphenylene sulfide | 10-20 parts by weight; |
| nano-clay | 2-10 parts by weight; and |
| nano-titanium dioxide | 1-2 parts by weight; |

wherein nano-clay has a particle size of 30-50 nm;

wherein nano-titanium dioxide has a particle size of 5-15 nm;

wherein nano-clay and nano-titanium dioxide has a mass ratio of (4-5):1.

2. The nanoscale polyamide composite material according to claim 1, wherein the polyamide resin comprises any one or a combination of at least two of polyamide 6, polyamide 66, or polyamide 610.

3. The nanoscale polyamide composite material according to claim 1, wherein the nanoscale polyamide composite material further comprises an auxiliary agent.

4. The nanoscale polyamide composite material according to claim 3, wherein the auxiliary agent in the nanoscale polyamide composite material has a content of 0.5-1.5 parts by weight.

5. A preparation method for the nanoscale polyamide composite material according to claim 1, comprising: blending and extruding the polyamide resin, polyphenylene sulfide, nano-clay, nano-titanium dioxide and an optional auxiliary agent to obtain the nanoscale polyamide composite material.

6. The preparation method according to claim 5, wherein the blending and extruding is performed at a temperature of 250-270° C.

7. An automobile, comprising a component that comprises the nanoscale polyamide composite material according to claim 1.

8. The automobile according to claim 7, wherein the component is selected from the group consisting of an automotive instrument panel that comprises the nanoscale polyamide composite material or an automotive steering wheel that comprises the nanoscale polyamide composite material.

* * * * *